United States Patent
Ferrari

(10) Patent No.: US 10,935,158 B2
(45) Date of Patent: Mar. 2, 2021

(54) INLET VALVE LOCKING SYSTEM FOR INFLATABLE UNDERWATER EQUIPMENT

(71) Applicant: Ferplast S.r.l., Sori (IT)

(72) Inventor: Cristiano Ferrari, Sori (IT)

(*) Notice: Subject to any disclaimer, the term of this patent is extended or adjusted under 35 U.S.C. 154(b) by 76 days.

(21) Appl. No.: 15/728,814

(22) Filed: Oct. 10, 2017

(65) Prior Publication Data

US 2019/0107223 A1 Apr. 11, 2019

(51) Int. Cl.
| | | |
|---|---|---|
| *F16K 35/02* | (2006.01) | |
| *F16K 15/20* | (2006.01) | |
| *F16K 15/18* | (2006.01) | |
| *F16K 15/06* | (2006.01) | |
| *B63C 11/22* | (2006.01) | |

(52) U.S. Cl.
CPC .......... *F16K 35/022* (2013.01); *F16K 15/063* (2013.01); *F16K 15/18* (2013.01); *F16K 15/205* (2013.01); *B63C 11/2245* (2013.01)

(58) Field of Classification Search
CPC .... F16K 35/022; F16K 15/205; F16K 15/025; F16K 15/026; F16K 15/028; F16K 15/18; F16K 1/42; F16K 1/427; F16K 3/246; B63C 11/2245; B63C 441/41; B63C 441/96; B63C 441/99
USPC ....... 251/321, 323, 360, 361, 363, 367, 310, 251/315.1; 137/234
See application file for complete search history.

(56) References Cited

U.S. PATENT DOCUMENTS

| | | | | |
|---|---|---|---|---|
| 1,886,159 | A * | 11/1932 | Brown | F22B 37/423 251/155 |
| 3,991,456 | A * | 11/1976 | Lieser | B23P 15/001 29/890.132 |
| 4,176,681 | A | 12/1979 | Mackal | |
| 4,512,358 | A * | 4/1985 | Kuzma | G05D 16/10 137/115.2 |
| 4,681,143 | A * | 7/1987 | Sato | B60G 17/08 137/625.37 |
| 5,853,071 | A * | 12/1998 | Robinson | B60T 11/30 188/352 |
| 7,213,609 | B2* | 5/2007 | Mentesh | F16K 5/0407 137/375 |
| 8,371,554 | B1* | 2/2013 | Beswick | F16K 1/303 137/910 |
| 2012/0187321 | A1* | 7/2012 | Small | F04B 53/1032 251/321 |

FOREIGN PATENT DOCUMENTS

| | | |
|---|---|---|
| DE | 20117613 | 3/2003 |
| GB | 941758 | 11/1963 |

\* cited by examiner

*Primary Examiner* — Kelsey E Cary

(74) *Attorney, Agent, or Firm* — Themis Law

(57) ABSTRACT

A valve locking system for inflatable underwater equipment includes an inlet valve positioned inside the main body of a power unit, and a retaining element of the valve also positioned in the main body perpendicularly to the actuation and mounting axis of the valve.

5 Claims, 3 Drawing Sheets

INLET VALVE LOCKING SYSTEM FOR INFLATABLE UNDERWATER EQUIPMENT

FIELD OF THE INVENTION

The present invention relates to a locking system for inflation valve for inflatable underwater equipment, for example, for buoyancy compensators.

BACKGROUND OF THE INVENTION

That type of equipment is provided with a device usually identified as a control unit that allows air to be inflated and/or discharged. In those devices, or control units, the inflation valve receives, through the supply connector, compressed air coming from the diving regulator, and fills air in the desired amount within the device to regulate floating attitude.

Existing inflation valve systems have drawbacks in regard to the complexity of the parts and their assembly and in regard to the requirement to limit the dimensions of the push-button operating the valve with consequent operating drawbacks in case of use of heavy protective gloves.

One example of a conventional inflation valve, which is made according to the prior art, for a control unit of a buoyancy compensator is schematically shown in FIG. 1.

On the main body 26 of a control unit, usually made of a plastic material, an inflation valve is locked by being screwed, and comprises a cylindrical chamber 27 formed in a containment bush 22, inside which a stopper 23 slides, for example in the form of a plunger, and which is provided with a retaining head 28 at one end, while at the end opposite the plunger 23 a push-button 24 is screwed. A cylindrical return spring 25 firmly urges the plunger 23 in the idle condition where the retaining head 28 abuts against a shoulder of the containment bush 22, for example the edge 29 on the head side of the containment bush 22. The plunger stopper 23, therefore, is firmly urged by the return spring 25 in the idle position, that is in the position closing the valve and is maintained in this position by the urging action of the spring and by the limit stop abutment 29 on the bush 22.

The spring 25 is interposed between the bush 22, and the push-button 24. The gas flow enters from the connector 21 passing in the chamber 27 delimited by the plunger 23 and by the inner shell wall of the containment bush 22. To this end the plunger 23 has a body provided with a radial annular narrowing for a given axial length whose diameter is smaller than the diameter of the inner shell wall of the bush 22, while said narrowing denoted by 123 is axially delimited by two radial enlargements 223 having a diameter substantially corresponding to or slightly lower than the diameter of the inner shell of the bush 22, which tightly adhere in an axially slidable manner against the inner shell wall of the bush 22 by means of a sealing gasket respectively. By pressing the push-button 24 such to overcome the force of the return spring 25, the plunger 23 is axially moved and opens the passage towards the inner part of the body 26, which passage is formed by the opening travel of the plunger 23 with respect to the bush 22 between the radially external shell wall of the plunger 22 and the inner shell wall of the bush 22 in the abutment edge area of the annular retaining enlargement 28 of the plunger. By releasing the push-button 24, the spring 25 brings the system back in closed condition.

The gas inlet connector 21 is also fastened to the body 26 by a screwing coupling, the body being provided with a fastening seat with an internally threaded portion wherein a corresponding external thread of the connector 21 is engaged.

As said above the conventional system described herein has several drawbacks:

The main body 26 of the control unit has to exhibit larger dimensions since it has to contain the thread locking the containment bush 22 in position therewith.

The anchoring thread between the containment bush 22 and the body 26 has to be obtained by molding or by machining, complicating the realization of components.

The dimension of the push-button 24, that has to be necessarily protected inside the body 26, is limited by the diameter of the containment bush 22 and by the housing of the spring 25.

Other examples of known control units are described in documents U.S. Pat. Nos. 4,720,281, 4,681,552 and US2008019777.

SUMMARY OF THE INVENTION

The present invention aims at providing a locking system for inflation valves for inflatable diving equipment that does not have the above mentioned drawbacks.

Moreover, the present invention aims at providing a locking system for inflation valves for inflatable diving equipment that is reliable and easy to be accessed in use.

The present invention aims also at providing a locking system for inflation valve for inflatable diving equipment simple and cheap to be manufactured and assembled.

Therefore the present invention relates to a locking system for inflation valve for inflatable diving equipment, composed of an inflation valve, placed inside a main body of a control unit and of a retaining element for the valve placed also inside the main body in a transverse position, preferably perpendicular to the axis of insertion of the inflation valve in a seat of the main body and/or to the operating axis of the valve.

One embodiment provides a system of said type in combination with a control unit to control the supply or discharge of air or other gas to at least one container of inflatable diving equipment, such as a so called BC or the like, which control unit comprises:

a main body wherein a passage duct is provided for air or gas from and to an inflatable bladder of said inflatable diving equipment;

a housing for a valve inflating and discharging said air or said gas, which valve is inserted in said air or gas passage duct and which valve is provided with manual operating members for being switched alternately in a closed position and in an open position of said passage duct;

a supply connector connected or connectable to a hose supplying air or said gas tightly connected to one end of the passage duct.

According to one embodiment, the housing for the valve is provided oriented with its axis transverse, preferably perpendicular to a branch of the passage duct to which the supply connector is tightly connected.

Said supply connector is the element holding the valve in the housing.

One embodiment provides the supply connector to have an end tubular extension that in the condition mounted in the main body of the control unit engages a peripheral recess of the valve body.

According still to one embodiment the valve body has a cylindrical symmetry and the housing for the valve in the main body is composed of a hole or through well that is a first branch of the air or gas passage duct, while a second branch of said passage duct is oriented radially with respect to said first branch and houses a supply connector in the form of a coaxial tubular element, since in the outer shell wall of the valve body coinciding with the outlet end of said second branch of the passage duct in said first branch of the passage duct a radial recess is made engaging the terminal end of said supply connector.

As an alternative to the above described embodiment, instead of the retaining member composed of the supply connector, a general retaining pin may be provided that can be inserted and locked in position in a housing hole oriented perpendicular to the first branch of the passage duct where the valve is housed and that intersects that first hole, the valve body being provided with a recess engaging said pin coinciding with the outlet end of the housing of said pin in the first passage duct.

In an advantageous embodiment, the valve is composed of a cylindrical containment bush, that has or forms an axial sliding chamber for a plunger-like stopper. Such plunger axially and tightly slides inside the cylindrical bush between a position closing the passage duct in the main body and a position opening the passage duct, while the bush is housed inside a first branch of an angled passage duct provided in the main body and the retaining element radially engages the bush by entering into a peripheral radial recess of the bush, housed in a seat perpendicular to the axis of the containment bush and/or to the operating axis of the plunger stopper.

In still a variant embodiment, the containment bush of the valve, placed inside the main body of the control unit, is provided with one or more radial peripheral locking lips oriented perpendicular to the axis of the bush or having at least one orientation component perpendicular to the axis of the bush.

In another variant embodiment, the containment bush of the stopper of the valve, placed inside the main body of the control unit, is provided with a radial locking seat.

Said element retaining or holding in position the bush in the housing thereof in the main body is provided with a locking extension engaging among one or more radial locking lips or tabs made in the containment bush.

According to a second advantageous implementation, the inflation valve is composed of the main body of a control unit, where a branch of the air or gas passage duct, from a supply hose to an inflation bladder through the main body, forms a sliding chamber for a plunger stopper which is axially slidably guided in that chamber, there being provided an element axially retaining the plunger in the housing branch. The retaining element is also housed in the main body, in a position perpendicular to the mounting axis of the plunger stopper and/or to the operating axis of the valve.

In one embodiment, the plunger, positioned inside the main body of the control unit, is provided with one or more radial locking shoulders that delimit one seat engaging the retaining element.

In one embodiment of that constructional variant of the control unit, the retaining element is provided with a locking extension inserted between the one or more lips or radial locking shoulders made on the plunger stopper.

In one embodiment, the retaining element engages at one inner end a locking recess provided in the plunger body.

Advantageously, a variant embodiment provides for said recess to be shaped as an annular reduction of the diameter of the plunger that has a predetermined axial extension and that is enables the plunger to be axially moved between the two positions corresponding to the conditions opening and closing the valve, preventing the plunger from overcoming such two positions and from leaving the chamber in the main body.

Advantageously, the retaining element provided with the extension locking the plunger/valve is composed of the supply connector of the inflation valve.

The present invention further relates to inflatable diving equipment provided with a locking system for an inflation valve for inflatable diving equipment as described above.

BRIEF DESCRIPTION OF THE DRAWINGS

Other features and advantages of the present invention will be clearer in the following detailed description of a specific implementation, with reference to enclosed drawings, which are provided by way of example and not as of limitation, and in which.

DETAILED DESCRIPTION OF EMBODIMENTS OF THE INVENTION

Figure 2:
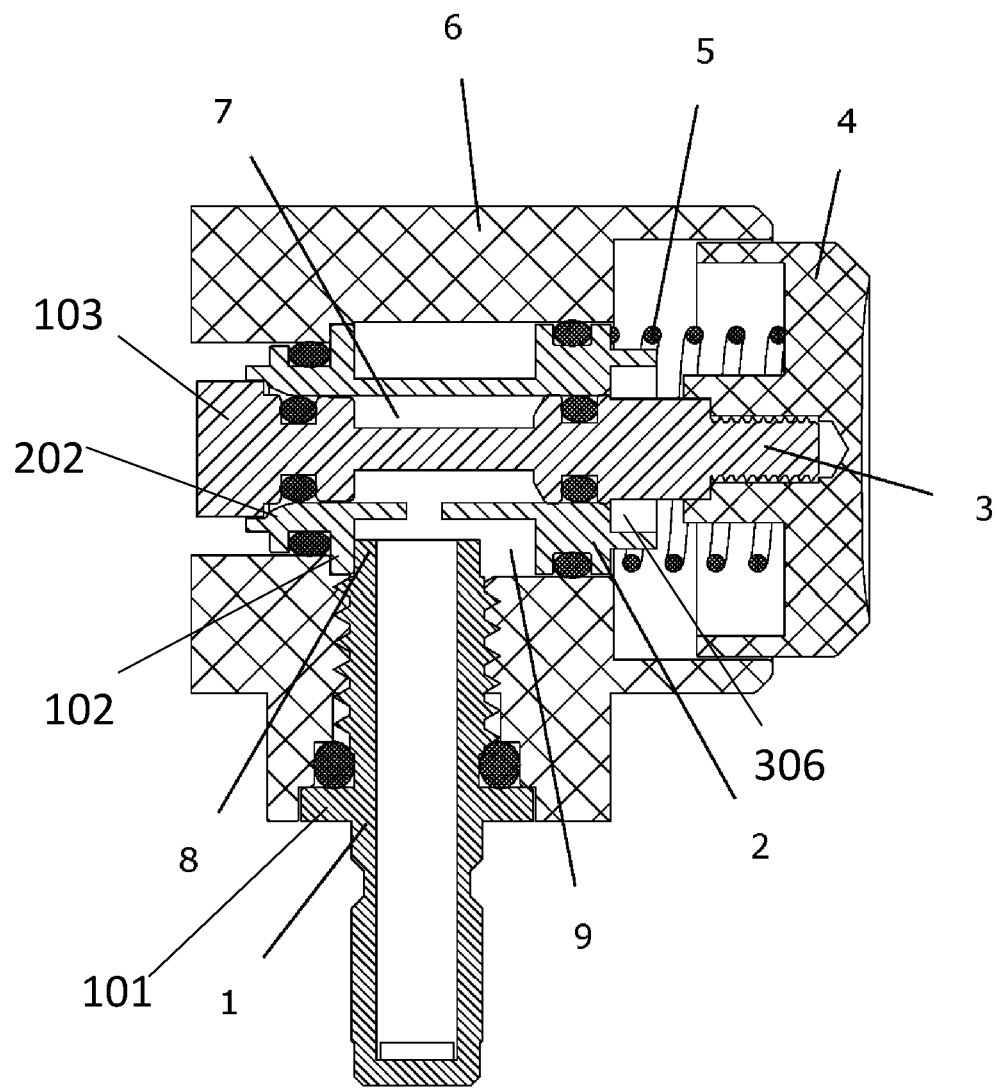
FIG. 2 is a cross-section schematic view of a locking system for an inflation valve for inflatable diving equipment according to the present invention.

FIG. 2 shows a first advantageous embodiment of the present invention, in which the main body 6 of a control unit (not shown in its entirety) is provided with a housing, made by machining or molding with no requirement for threads, for the inflation valve. The valve is composed of a cylindrical chamber 7 formed in a containment bush 2, on the outer side wall of which a radial locking seat 9 is obtained in the present embodiment. The radial seat 9 is delimited by two walls perpendicular to the axis of the containment bush 2 and spaced from each other to a predetermined extent in the axial direction of the bush.

On the same main body 6 there is provided a branch of the passage duct for air or gas to be supplied to at least one inflatable bladder. That branch is perpendicular to the insertion axis of the bush 2 and/or to the movement direction of a plunger stopper 3. A retaining element 1 is mounted in this branch of the passage duct and contemporaneously acts also as the valve supply connector.

The branch of the air or gas passage duct wherein said connector is housed intersects and/or comes out in the hole housing the bush 2 in a position coinciding with the radial engagement seat between the two radial shoulders.

One of the two radial walls denoted by 102 is provided in the end area of the bush 2, which is the valve seat closed and opened by the plunger 3. The wall 102 is provided in such a position that in the mounted condition an inner end of the connector forming the retaining element 1 abuts against the radial wall 102 and keeps the bush 2 in position.

The retaining element composed of the connector 1 is provided with a locking extension 8 fitting in the radial seat 9 of the bush 2.

A plunger stopper 3 slides Inside the containment bush 2 and a push-button 4 is connected thereto. A cylindrical return spring 5, interposed between the push-button 4 and the containment bush 2, enables the push-button to return back in the idle position. In particular, the spring 5 is interposed between the end of the bush 2 facing the push-button 4 and the push-button 4.

The push-button 4 is protected and externally guided by a ring obtained in the body 6. The gas flow enters from the connector 1, is intercepted in chamber 7 radially and axially delimited by a reduced diameter region of the plunger 3 and by the inner shell wall of the containment bush 2.

By pressing the push-button 4, the plunger 3 opens the passage toward the inner part of the body 6. That passage is provided at the end of the bush 2 opposite to the push-button 4 and has a conically divergent shape or shape with curved walls denoted by 202. By releasing the push-button 4 the spring 5 returns the plunger back in the closed condition, as shown in FIG. 2. An end radial enlargement 103 of the plunger 3 is the stop return abutment of the plunger 3 with respect to the bush 2 defining the closed position of the aperture 202 such as shown in FIG. 2.

The plunger is made substantially like the one described with reference to FIG. 1, with a radial narrowing having a given axial length and separating radial annular shoulders from each other, which are the head surfaces of radial enlargements. These have an outer diameter substantially corresponding to the inner diameter of the containment bush 2 and anyway such to allow the plunger 3 to axially slide in the bush 2 and tightly adhere against the inner shell surface of the bush 2 by a gasket respectively.

Functional components of the inflation valve are contained in the containment bush 2, which can be made as a finished operational part already pre-assembled and tested, and has to be simply fit by being pressed in its seat, where it is locked by the retaining element 1, which in the specific case is the supply connector.

As it is clear from the figures, the supply connector is lockable in the corresponding branch of the passage duct in the body 6 by an externally threaded portion cooperating with an internally threaded portion of said branch. A stop screwing abutment flange 101, with which a seal gasket cooperates, locks the connector in the position where the extension 8 engages the seat 9.

Figure 3:
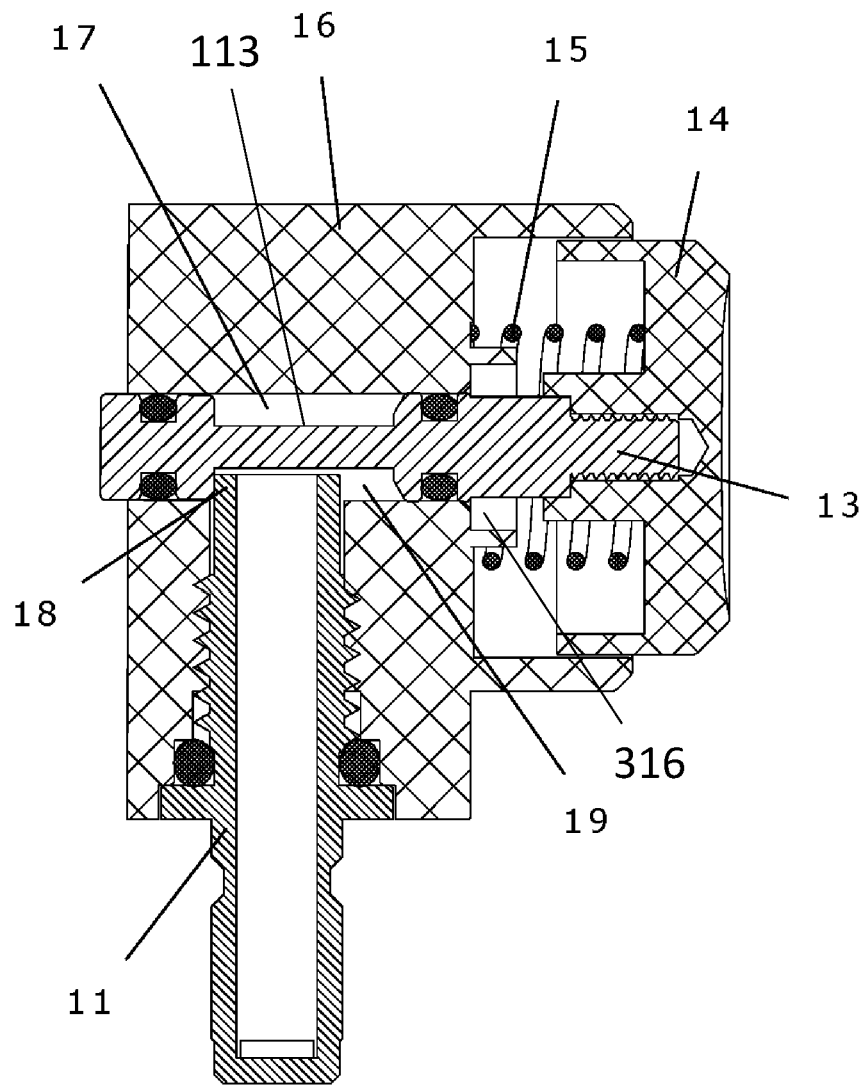
FIG. 3 is a cross-section schematic view of a locking system for an inflation valve for inflatable diving equipment according to the present invention.

FIG. 3 shows a second advantageous embodiment, in which the chamber 17 housing the stopper 13 is directly formed in the main body 16 of a control unit, without using any containment bushes. In this case the locking extension 18 of the retaining element 11, namely of the supply connector, fits in a radial seat 19 defined by a radial annular narrowing of the plunger 13.

Figure 1:
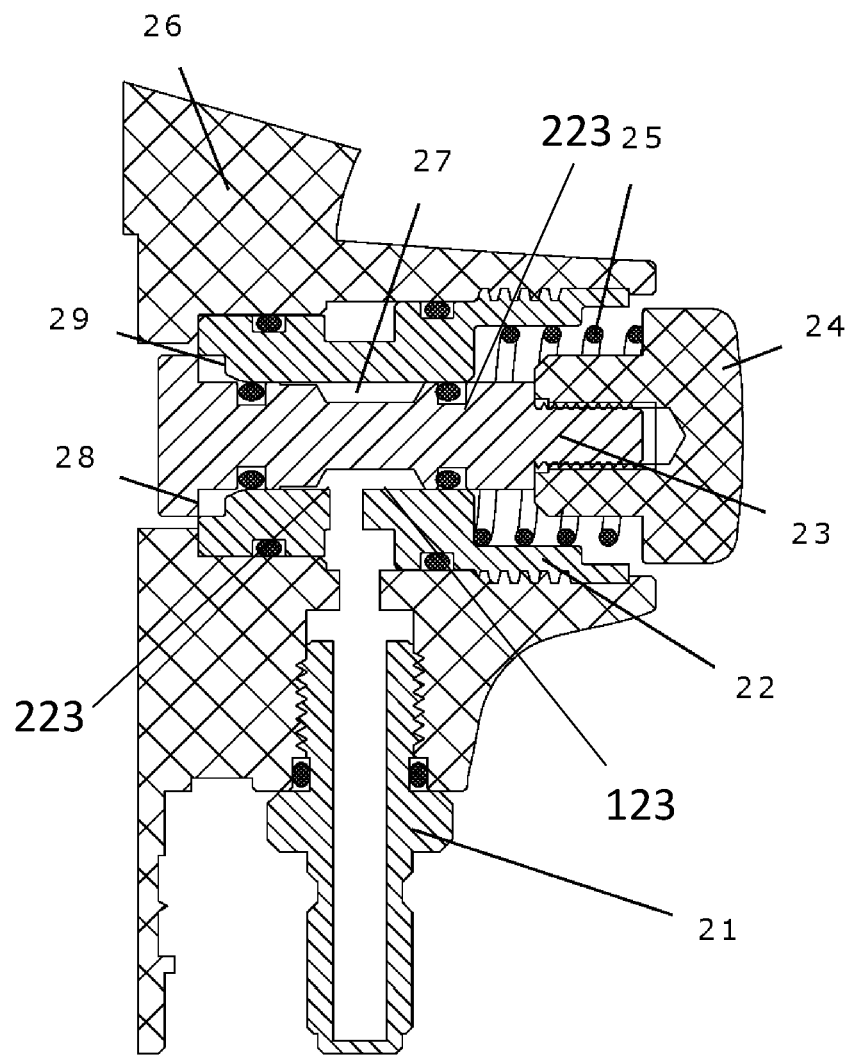
FIG. 1 is a cross-section schematic view of a locking system for an inflation valve for inflatable diving equipment of the conventional type.

The plunger 13 is made substantially like the plunger of FIGS. 1 and 2. The axial delimiting walls of the annular radial narrowing 113 of the body of the plunger 13 are axially spaced apart at such a distance that they are the stop abutments of the displacement axial travel of the plunger 13 between the closed and open positions of the valve. Therefore, unlike the embodiment illustrated in FIG. 2, in this embodiment additional stop locking elements need not be provided in the idle position of the stopper.

In both of the embodiments of FIGS. 2 and 3, the body 6, 16 does not need a thread in the seat to anchor the valve therein, thus simplifying molding and mounting of the control unit.

In both of the embodiments, the diameter of the push-button 4, 14 is no longer constrained to the dimension of the containment bush 2 and, therefore, can be enlarged by making a guide ring 306, 316 on the body 6-16 and allowing the push-button 4-14 to be driven more easily, even by hands protected with heavy gloves.

In according with the invention, additional variants and/or improvements are possible such as, for example, using a locking element different from the supply connector and/or the positioning thereof not in a seat obtained in the bush and/or in the plunger or in the stopper but against one of the ends thereof.

A further possible variant can provide a retaining element with the task of locking the containment bush and contemporaneously acting to lock the plunger in the stop idle position.

All is obtained by a locking seat of the containment bush formed as an aperture in the wall of the bush, through which the extension of the retaining element reaches the radial seat formed in the body of the plunger.

Therefore, the present invention enables overcoming the drawbacks of prior art known valve systems and provides a locking system for an inflation valve that is simple and reliable, inexpensive to manufacture and assemble and adaptable to all types of inflatable diving equipment.

All of the above, as described and shown, is susceptible to changes and improvements, without changing the main principle of the invention as defined in the enclosed claims.

The invention claimed is:

1. An inlet valve locking system for inflatable underwater equipment comprising:
   a main body;
   a containment bush received within a first longitudinal opening in the main body, the containment bush having a locking seat defined on an outer wall;
   a supply connector received laterally in the main body and having a locking extension received in the locking seat of the containment bush, the locking extension laterally abutting against a radial wall of the locking seat; and
   a plunger stopper disposed to slide longitudinally within a second longitudinal opening in the containment bush, a lateral cavity on an outer wall of the plunger stopper defining a chamber, the plunger stopper having a first end engaged to a push button and an enlarged second end,
   wherein the containment bush is longitudinally restrained in position by having the radial wall of the locking seat disposed between an abutment wall in the main body and the locking extension of the supply connector,
   wherein a longitudinal run of the plunger stopper is defined, in a first direction, by a longitudinal run of the push button and, in a second direction, by an end stop of the enlarged second end against an abutting surface in the second longitudinal opening of the containment bush, and
   wherein a fluid is able to flow to the chamber defined by the outer wall of the plunger stopper by traveling through a lumen in the supply connector and through an aperture defined in the locking seat in the containment bush, and to flow out of the chamber through a gap between the containment bush and the plunger stopper created when the plunger stopper slides longitudinally in the first direction.

2. The inlet valve locking system according to claim 1, further comprising a biasing member disposed between the push button and the main body, the longitudinal run of the push button being defined by a length of travel of the push button between an outward position, in which the biasing member pushes the push button outwardly of the main body, and an inward position, in which the push button is pushed inwardly against a stopping wall in the main body.

3. The inlet valve locking system according to claim 2, wherein the biasing member is a cylindrical spring.

4. The inlet valve locking system according to claim 2, wherein the longitudinal run of the push button is further defined by having a lateral wall of the push button travel within a longitudinal guide defined in the main body.

5. The inlet valve locking system according to claim 1, wherein the supply connector comprises an abutment flange extending laterally from a body of the supply connector, an amount of penetration of the supply connector into the main body being defined by the abutment flange abutting against a corresponding abutting seat in the main body.

\* \* \* \* \*